N. B. MILLER.
PACKING.
APPLICATION FILED APR. 1, 1914.

1,182,294.

Patented May 9, 1916.

WITNESSES

G. E. Sterritte
L. C. Fraker

INVENTOR

Norman Bruce Miller
BY
Arthur Phelps Marr
ATTORNEY

UNITED STATES PATENT OFFICE.

NORMAN B. MILLER, OF HADDON HEIGHTS, NEW JERSEY.

PACKING.

1,182,294.  Specification of Letters Patent.  Patented May 9, 1916.

Application filed April 1, 1914. Serial No. 828,939.

*To all whom it may concern:*

Be it known that I, NORMAN BRUCE MILLER, a citizen of the United States, and resident of the town of Haddon Heights, county of Camden, State of New Jersey, have invented certain new and useful Improvements in Packings, of which the following is a specification.

This invention relates to what is ordinarily termed piston packings. The somewhat elastic and usually fibrous rings placed in stuffing boxes, to be compressed by the box to a more or less firm impingement upon the piston rod which passes through the box.

It has been found that it is particularly difficult to so confine the packing that no leak will take place around the piston rod and it is my belief that this is so because the great friction to which a packing is subjected by the rapidly moving rod wears the packing thereby requiring constant re-adjustment thereof in lieu of which a leak is bound to occur.

In designing this packing I have had in mind to produce a packing that is in itself highly efficient and particularly satisfactory for all purposes and I have added to my packing certain improvements that tend to obviate the wear to increase the lubrication and to materially add to the efficiency and rapid adjustment of the packing. The construction and other advantages to be derived therefrom together with the operation will be set forth as the specification progresses.

The following is what I consider the best means of carrying out this invention.

Figure 1:
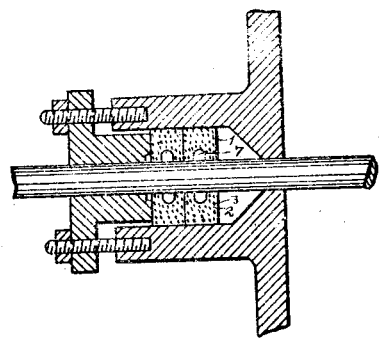
Figure 2:
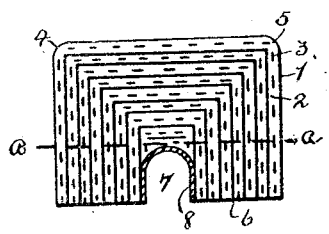
Figure 3:
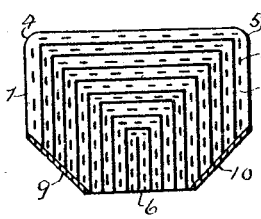
Figure 4:
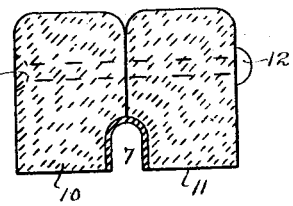

The accompanying drawings form a part of this specification, in which:

Figure 1 shows in section a stuffing box, a piston rod passing therethrough and my packing in operable position therein. Fig. 2 shows a section of my packing. This and the remaining figures are on a larger scale. Fig. 3 shows a section of packing of somewhat different construction the use of which would obtain certain of the advantages of my invention. Fig. 4 is a section through a packing formed in two parts but so constructed as to obtain the advantages of my invention and other advantages to be described later.

Similar reference numerals indicate like parts in all the figures where they appear.

This packing that I have designed is constructed of alternate layers of rubber or other suitable resilient and semi-plastic material combined under pressure with certain layers of canvas or duck. In producing my packing I arrange that the canvas shall be molded in or otherwise combined with the plastic and resilient material in such a manner that the canvas will be impregnated with the plastic material and the whole will have the effect of being formed integral.

At 1, I have shown a section packing, 2 indicates the plastic material and the dotted lines 3 indicate canvas or other fibrous material inserted for the purpose of increasing the stability and compression strength of the packing. It will be noted that my packing is oblong in section and that the upper corners 4 and 5 are rounded, the face is however cut or trimmed so that this face shall be straight and smooth. In the lower face 6 of my packing I produce an upwardly extending aperture or cavity 7, this cavity cuts away the portion of the canvas and plastic material and produces a centrally disposed trough through the full length of my packing. In practice I line this trough as shown at 8, with rubber or other waterproof material and I arrange that the top of the trough shall not extend above the compression line $a$—$a$, the line above which the force will be applied when the packing is compressed in a stuffing box.

When my packing is complete as shown and before it is inserted into the suffing box I may fill the cavity 7 with a lubricating material such as grease, graphite or a combination of grease and graphite or with any other suitable lubricant. This having been accomplished the packing is cut or coiled, and then cut to form the proper number of rings. This packing may be inserted either as a ring packing or a spiral packing it requiring no more careful attention in fitting than any ordinary soft packing. After being cut to fit the packing is placed in position and the gland or stuffing box is adjusted so that the packing is compresed to a desirable degree. It will be found that my packing may be caused to impinge upon the rod with greater firmness than is possible with ordinary packing because the self lubricating qualities reduce the friction to a minimum.

Thus far I have described the filling of the trough or cavity 7 with a lubricant before the packing is placed in position. In operation however I have found that a most peculiar condition arises that is, that if oil is used as the lubricant it is only necessary to wet the packing with oil before it is placed in position then during the operation of the piston the oil fed to the cylinder through an ordinary lubricator will gather in the recess in my packing filling the recess and remaining as an efficient lubrication for the piston rod.

In Figs. 3 and 4 I show other means for accomplishing the desirable results and for obtaining the recess or cavity into which the lubricating material is to be received. In Fig. 3 this means consists of cutting away a portion of the outer edges as indicated at 9 and 10 but I prefer if this is done that the facings of the cuts be covered with rubber or other suitable material. Now when two rings of packing are placed side by side the result will be a liberal V shaped space well adapted to receive any suitable lubricant. At Fig. 4, I show how it is possible to construct my packing in two parts 10 and 11 and these parts may be secured together by a suitable rivet 12. I may provide this rivet with a large head and I may also provide a recess 13 in alternate rings of the packing allowing the head 12 to enter the recess for the purpose of securing a closer fit and more permanent alinement of the packing.

Other modifications may be made within the scope of the appended claims without departing from the principle or sacrificing the advantages of this invention.

Having carefully and fully described my invention what I claim and desire to secure by Letters Patent is:—

1. A packing of resilient material having a channel formed therein for the reception and temporary retention of a lubricant and a waterproof shield within said channel to retain the lubricant away from said packing.

2. A packing of resilient and fibrous material formed in layers and arched, said packing being provided with an open recess extending inward to an extent less than one-half the thickness of the packing and wholly away from the pressure receiving portion of said packing as herein specified and for the purpose set forth.

3. A flexible packing the entire cross section of which is arched and in layers and having both ends of each layer upon the same plane said packing being provided with a centrally disposed space or cavity extending inward to an extent substantially interior to the pressure receiving portion of said packing and into which lubricating material may collect for the purpose set forth.

Signed at New York city, in the county and State of New York this 18th day of March, 1914.

N. B. MILLER.

Witnesses:
G. E. STERRITTE,
L. C. FRAKER.